US 011926437 B2

United States Patent
Good

(10) Patent No.: US 11,926,437 B2
(45) Date of Patent: Mar. 12, 2024

(54) METHODS AND APPARATUS TO MEASURE MULTIPLE CONTROL SURFACES WITH A SENSOR

(71) Applicant: The Boeing Company, Chicago, IL (US)

(72) Inventor: Mark S. Good, Seattle, WA (US)

(73) Assignee: The Boeing Company, Arlington, VA (US)

( * ) Notice: Subject to any disclaimer, the term of this patent is extended or adjusted under 35 U.S.C. 154(b) by 1153 days.

(21) Appl. No.: 16/457,096

(22) Filed: Jun. 28, 2019

(65) Prior Publication Data

US 2020/0407080 A1 Dec. 31, 2020

(51) Int. Cl.
*B64F 5/60* (2017.01)
*B64C 9/26* (2006.01)

(52) U.S. Cl.
CPC . *B64F 5/60* (2017.01); *B64C 9/26* (2013.01)

(58) Field of Classification Search
CPC .. B64F 5/60; B64C 9/26; B64C 13/00; B64D 2045/001; B64D 45/0005
See application file for complete search history.

(56) References Cited

U.S. PATENT DOCUMENTS

| 4,892,274 | A | 1/1990 | Pohl et al. |
| 10,227,143 | B2 | 3/2019 | Good |
| 2010/0213310 | A1* | 8/2010 | Flatt ................... F16H 25/2021 244/99.2 |
| 2011/0255968 | A1 | 10/2011 | Recksiek |
| 2013/0213160 | A1* | 8/2013 | Flores Giraldo ....... F16H 19/04 74/30 |
| 2014/0378263 | A1* | 12/2014 | Hayes .................. B60K 17/165 475/220 |
| 2015/0083852 | A1* | 3/2015 | Moser ....................... B64C 9/14 244/99.3 |
| 2018/0273199 | A1* | 9/2018 | Harrington ............... B64C 9/16 |
| 2019/0308721 | A1* | 10/2019 | Kakaley .................. B64C 27/57 |
| 2019/0315449 | A1* | 10/2019 | Bowers .................... B64C 13/38 |

FOREIGN PATENT DOCUMENTS

| EP | 1088753 A2 | 4/2001 |
| EP | 1088753 A3 | 8/2002 |
| EP | 2851284 | 3/2015 |
| EP | 2881714 | 6/2015 |

OTHER PUBLICATIONS

European Patent Office, "Extended European Search Report," issued in connection with European Patent Application No. 20173954.7, dated Nov. 3, 2020, 6 pages.
European Patent Office, "Communication pursuant to Article 94(3) EPC," issued in connection with European Patent Application No. 20173954.7, dated Mar. 14, 2022, 4 pages.

* cited by examiner

*Primary Examiner* — Andrew Schechter
*Assistant Examiner* — Jeremy A Delozier
(74) *Attorney, Agent, or Firm* — HANLEY, FLIGHT & ZIMMERMAN, LLC

(57) ABSTRACT

Methods and apparatus to measure multiple control surfaces with a sensor are disclosed. A disclosed example apparatus for determining a condition associated with first and second control surfaces includes a sensor to measure a rotation of a shaft operatively coupled thereto. The apparatus also includes a first differential operatively coupled between the shaft and a first pivot of the first control surface, and a second differential operatively coupled between the first differential and a second pivot of the second control surface.

32 Claims, 13 Drawing Sheets

| | N1 | N2 | N4 | N6 |
|---|---|---|---|---|
| NORMAL RETRACTED | 0 | 0 | 0 | 0 |
| NORMAL EXTENDED | 240 | 80 | 80 | 80 |
| ONE PANEL OVEREXTENDED | 250 | 80 | 80 | 90 |
| THREE PANEL OVEREXTENDED | 270 | 90 | 90 | 90 |
| ONE PANEL UNDER EXTENDED | 230 | 80 | 80 | 70 |
| ONE PANEL UNDER RETRACTED | 10 | 0 | 0 | 10 |
| DISCONNECT IN SENSOR DRIVELINE | 280 | ? | ? | ? |

METHODS AND APPARATUS TO MEASURE MULTIPLE CONTROL SURFACES WITH A SENSOR

FIELD OF THE DISCLOSURE

This disclosure relates generally to surface deflection measurements of control surfaces, and, more particularly, to methods and apparatus to measure multiple control surfaces with a sensor.

BACKGROUND

Angular deflections (e.g., rotational angles) of aerodynamic control surfaces can impact aerodynamic efficiency of an aircraft. In particular, aerodynamic degradation and/or relatively low performance can result from a control surface deviating from a commanded position (e.g., a commanded angular orientation). An extent to which the aerodynamic efficiency degrades can be dependent on how many control surfaces are not in their commanded position and/or an amount of angular deviation of the control surfaces relative to their commanded positions.

Known systems use a system driveline sensor assembly to monitor multiple control surfaces. In such known systems, the control surfaces are monitored for deviations from command positions and motors are controlled to bring the control surfaces to the corresponding commanded positions. While the system is in motion (i.e., the motors are adjusting the position(s) of the control surfaces), jams and disconnects can prevent at least some of the control surfaces from reaching their commanded positions. Accordingly, individual control surfaces are monitored by respective sensors. However, these sensors can be problematic due to their complexity.

SUMMARY

An example apparatus for determining a condition associated with first and second control surfaces. The apparatus includes a sensor to measure a rotation of a shaft operatively coupled thereto. The apparatus also includes a first differential operatively coupled between the shaft and a first pivot of the first control surface, and a second differential operatively coupled between the first differential and a second pivot of the second control surface.

An example aerodynamic body for use with a vehicle includes first and second control surfaces, and at least one actuator to move the first and second control surfaces. The aerodynamic body also includes first and second differentials. The first differential is operatively coupled between the shaft and a pivot associated with the first control surface. The second differential is operatively coupled between the first differential and a second pivot associated with the second control surface. The aerodynamic body also includes a rotational sensor operatively coupled to the shaft, where the rotational sensor is to measure a rotation of the shaft to determine a condition associated with the first and second control surfaces.

An example non-transitory machine readable medium includes instructions, which when executed, cause a processor to at least determine a rotational displacement of a shaft operatively coupled to a first differential, where the first differential is operatively coupled between the shaft and a first pivot associated with a first control surface, and where a second differential is operatively coupled between the first differential and a second pivot associated with a second control surface. The instructions further cause the processor to compare the determined rotational displacement to at least one expected rotational value, and calculate a condition of at least one of the first or second control surfaces based on the comparison.

Figure 1:
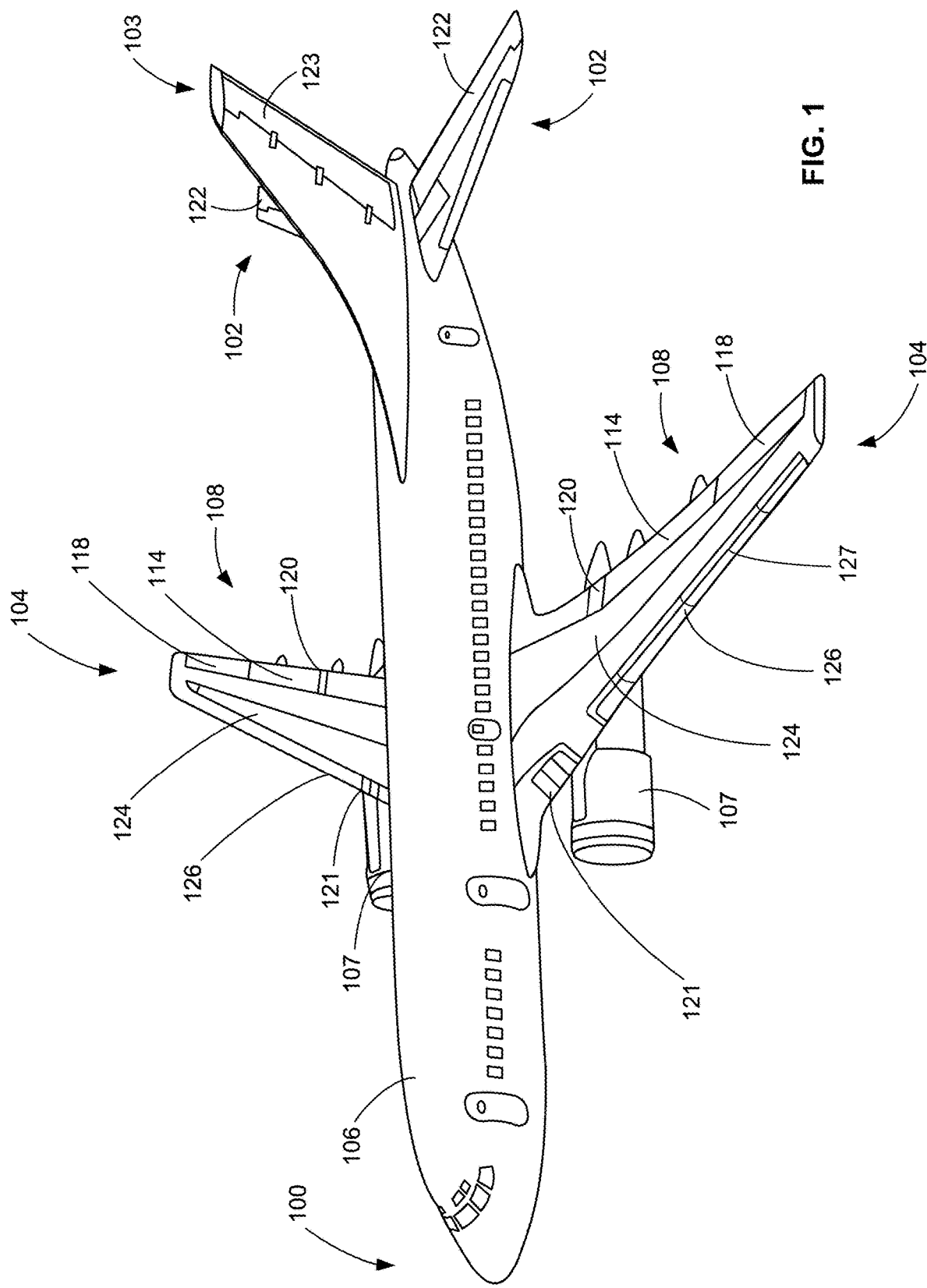
FIG. 1 is an aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods and apparatus to measure multiple control surfaces with a sensor are disclosed. Some aircraft employ known system driveline sensor assemblies to monitor deflections of multiple control surfaces (e.g., flaps of a wing). In particular, these known system driveline sensor assemblies employ multiple sensors to detect positions (e.g., angular rotations) of individual corresponding control surfaces. In particular, each sensor is implemented to measure deflections of a single corresponding control surface. However, these sensors can be problematic, and integrating multiple ones of these sensors can result in significant system complexity, thereby necessitating a significant number of components, weight and cost to a vehicle.

Examples disclosed herein provide a cost-effective, reliable and accurate manner of determining and/or measuring deflections of multiple control surfaces using a single rotational sensor (e.g., a rotational sensor assembly). Examples disclosed herein utilize a sensor operatively coupled to multiple differentials, which can be arranged across a span of an aerodynamic body (e.g., a wing, an aircraft body, a vehicle, body, etc.), for example, to determine a condition and/or deflection of multiple control surfaces. In particular, a first differential is operatively coupled between the sensor, which measures rotation, and a pivot associated with a first control surface. A second differential is operatively coupled between the first differential and a pivot associated with a second control surface. Accordingly, the rotation at the first differential is measured by the sensor to determine an angular deflection and/or a condition (e.g., an operating condition) of at least one of the first or second control surfaces. The condition may include, under-extension, over-extension, a driveline disconnect failure, etc. In some examples, a third differential is operatively coupled between the second differential and a third pivot associated with a third control surface. In some such examples, the sensor can determine an angular deflection and/or a condition associated with the third control surface.

In some examples, the measured angular rotation is compared to at least one expected rotation value (e.g., a summed rotation value of the first, second and third differentials). The at least one expected rotation value may be an expected deflected rotation value and/or an expected retracted rotation value. In some examples, the first, second and/or third control surfaces are flaps of an aircraft. In some examples, the measured angular rotation is used to determine whether a driveline disconnect failure has occurred. In some examples, a torsional spring is operatively coupled to the sensor to rotate a shaft coupled to the first differential to a default position when the driveline disconnect failure has occurred.

As used herein, the term "control surface" refers to a movable surface of which a translational movement, rotation and/or a deflection is varied. Accordingly, the term "control surface" can refer to an aerodynamic surface that is deflected and/or translated to affect aerodynamic properties of a vehicle, for example. As used herein, stating that a device is "coupled between" or "operatively coupled between" means that the device is functionally placed between first and second components and, thus, intervening components may be placed between the first and second components. For example, a first component is operatively coupled to an input of the device and a second component is operatively coupled to an output of the device. As used herein, the term "differential" refers to a device having an input that rotates at a different rate and/or displacement from its output.

FIG. 1 illustrates an example aircraft 100 in which examples disclosed herein can be implemented. In the illustrated example, the aircraft 100 includes horizontal tails 102, a vertical tail 103 and wings 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers. In some examples, the control surfaces 108 are operated (i.e., displaced) independently of one another. The example control surfaces 108 include trailing edge flaps (e.g., rotatable flaps) 114, ailerons 118, flaperons 120, leading edge Krueger flaps 121 and leading edge slats 127. In this example, the horizontal tails 102 include elevators 122 and the vertical tail 103 includes a rudder 123. The wings 104 also define upper and lower surfaces (e.g., upper and lower sides, upper and lower aerodynamic surfaces, etc.) 124, 126, respectively.

To control flight of the aircraft 100, the control surfaces 108 alter the lift and pitch of the aircraft 100. The control surfaces 108 of the illustrated example also play a role in controlling the speed of the aircraft 100. Any of the control surfaces 108 of the illustrated example may be independently moved (e.g., deflected) to control the load distribution in different directions over the wing 104, thereby directing movement of the aircraft 100. In some examples, during cruise of the aircraft 100, the control surfaces 108 are moved to reduce the drag of the aircraft 100.

Examples disclosed herein can be used to sense and/or determine a degree of movement and/or a condition of multiple movable components, such as the control surfaces 108. Examples disclosed herein may be applied to the control surfaces 108, the Krueger flaps 121, the slats 127, the flaps 114, the ailerons 118, the flaperons 120, the tails 102, 103, the wings 104, the fuselage 106, the engines 107 and/or any other exterior or outboard structure (e.g., a horizontal stabilizer, a wing strut, an engine strut, a canard stabilizer, etc.) of the aircraft 100. Additionally or alternatively, in some examples, the fuselage 106 has control surfaces, which may be deflected, to alter the flight maneuvering characteristics during cruise and/or takeoff of the aircraft 100.

Figure 2:
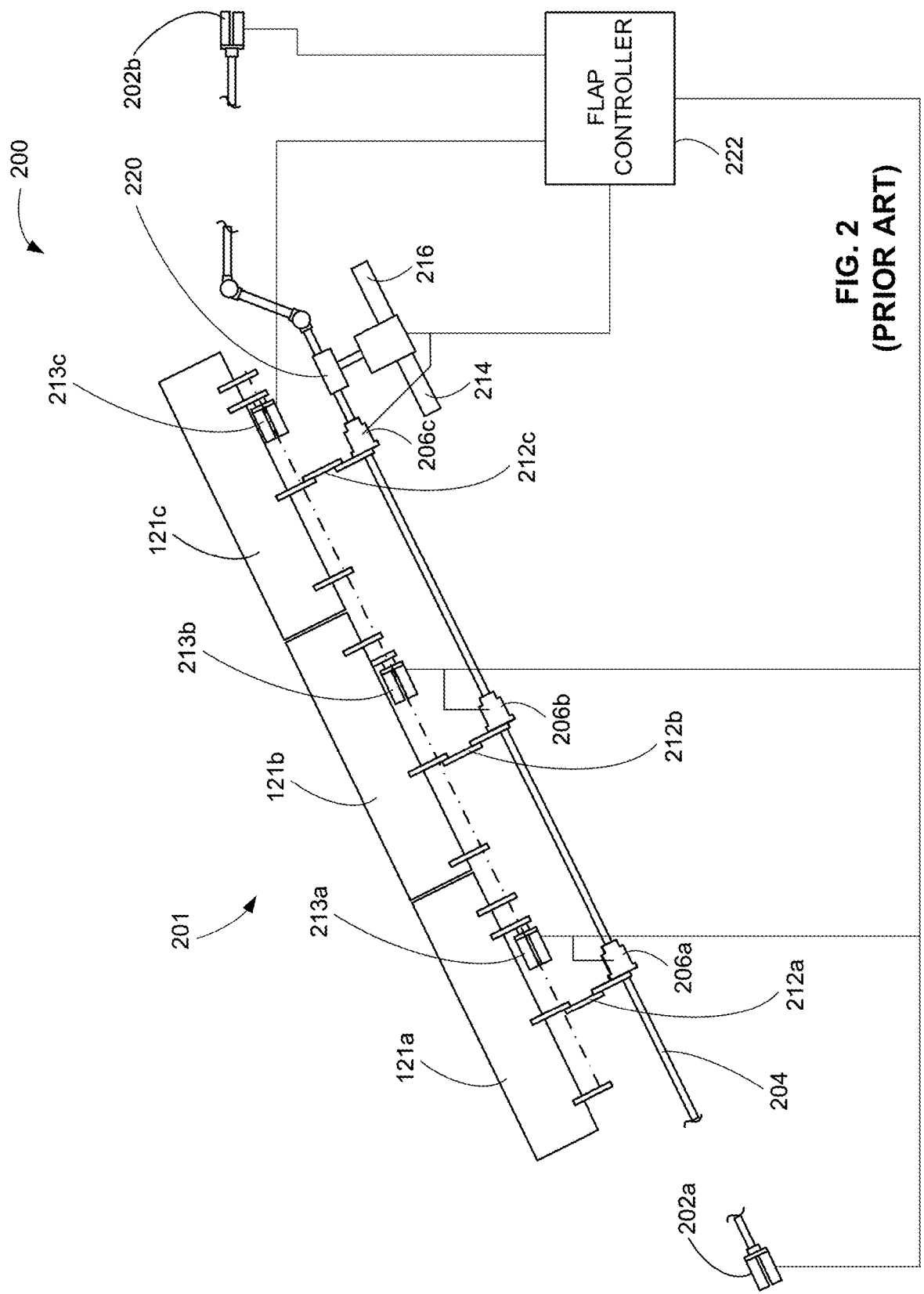
FIG. 2 illustrates a known sensing system.

FIG. 2 illustrates a known sensing system 200, which is implemented with a Krueger flap system 201. The known sensing system 200 includes drive line position sensors 202 (hereinafter 202a, 202b, etc.), a drive shaft 204, actuators 206 (hereinafter 206a, 206b, 206c, etc.), and the flaps 121 (hereinafter 121a, 121b, 121c, etc.), which are operatively coupled to the shaft 204 via corresponding arms (e.g., linkages) 212 (hereinafter 212a, 212b, 212c, etc.). In this known implementation, sensors 213 (hereinafter 213a, 213b, 213c, etc.) are operatively coupled to the respective flaps 121a, 121b, 121c. The known sensing system 200 also includes a hydraulic motor 214, an electric motor 216 and gearing 220, which may be implemented as differential in some examples. Further, the hydraulic motor 214 and the electric motor 216 are communicatively coupled to a flap controller 222 which, in turn, is communicatively coupled to the drive line position sensors 202a, 202b.

To control movement of the flaps 121a, 121b, 121c, the flap controller 222 utilizes data (e.g., positional data, rotational displacement data, etc.) received from the drive line sensors 202a, 202b to direct movement of at least one of the hydraulic motor 214, the actuators 206a, 206b 206c and/or the electric motor 216. As a result, motion is translated from the gearing 220 to the drive shaft 204, thereby causing the arms 212a, 212b, 212c to deflect the corresponding flaps 121a, 121b, 121c.

To determine and/or sense a position of each of the flaps 121a, 121b, 121c, the flap controller 222 receives angular rotation data from each of the sensors 213a, 213b, 213c. In particular, one of the sensors 213a, 213b, 213c is implemented for each one of the flaps 121a, 121b, 121c. Accordingly, the known sensing system 200 can be subject to malfunction when any one of the three sensors 213a, 213b, 213c fails and/or malfunctions.

In contrast, examples disclosed herein utilize instead a single sensor and/or sensor assembly to determine a condition associated with multiple movable control surfaces. As will be discussed in greater detail below in connection with FIGS. 3-11, the aforementioned single sensor is implemented with multiple differentials to enable the sensor to determine deflection(s) and/or a condition of the flaps 121a, 121b, 121c.

Figure 3:
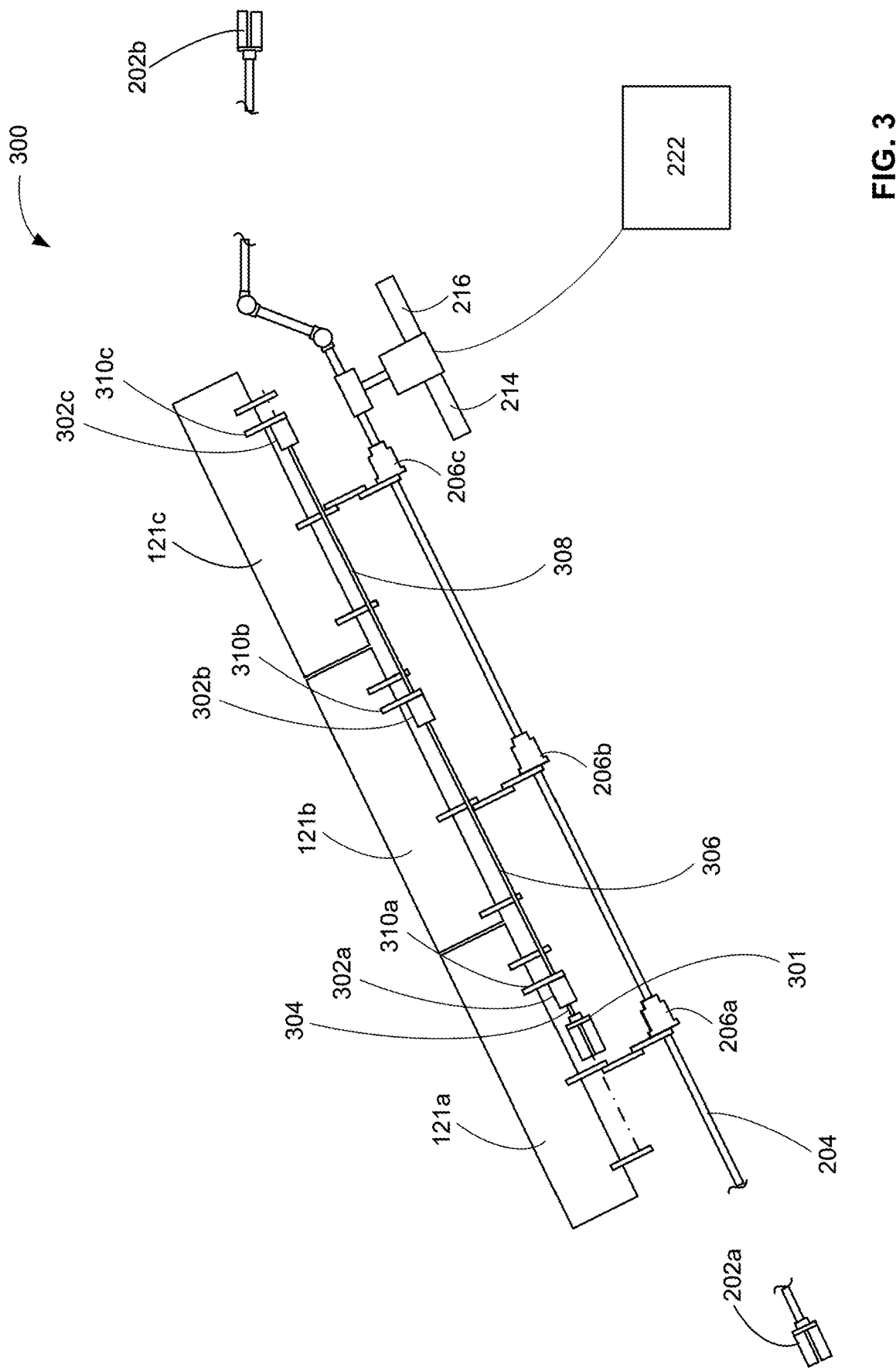
FIG. 3 illustrates an example sensing system in accordance with teachings of this disclosure.

FIG. 3 illustrates an example sensing system 300 in accordance with teachings of this disclosure. The sensing system 300 of the illustrated example includes a sensor (a sensor assembly) 301, differentials 302 (hereinafter 302a, 302b, 302c, etc.), and shafts 304, 306, 308. Further, the sensor 301 includes pivots (e.g., linkages, pivot arms, etc.) 310 (hereinafter 310a, 310b, 310c, etc.). In this example, the shafts 304, 306, 308 are operatively coupled to the respective flaps 121a, 121b, 121c, as well as the respective differentials 302a, 302b, 302c. Further, the drive line position sensors 202a, 202b are shown operatively coupled to the drive line shaft 204 which, in turn, is operatively coupled to the actuators 206a, 206b. 206c. Moreover, at least one of the hydraulic motor 214 and the electric motor 216 is operatively coupled to the shaft 204 or the actuators 206a, 206b, 206c. In this example, at least one of the sensor, 301, the actuators 206a, 206b, 206c, the hydraulic motor 214 and/or the electric motor 216 is communicatively coupled to the flap controller 222.

To determine a condition and/or a deflection of the flaps 121a, 121b, 121c, the sensor 301 of the illustrated example measures movement and/or positional change of the shaft 304 that is operatively coupled to an input of the first differential 302a. Further, the first differential 302a is operatively coupled (e.g., mounted) to the flap 121a via the pivot 310a positioned at its output. In other words, the first differential 302a is operatively coupled between the shaft 304 and the pivot 310a. Further, the shaft 306 is operatively coupled to the output of the first differential 302a and an input of the second differential 302b while the shaft 308 is operatively coupled to an output of the second differential 302b and an input of the third differential 302c. The pivot 310b associated with the flap 121b is coupled to the output of the second differential 302b and, thus, the second differential 302b is operatively coupled between the first differential 302a and the pivot 310b. Moreover, the pivot 310c associated with the flap 121c is coupled to the output of the third differential 302c. Accordingly, the third differential 302c is operatively coupled between the second differential 302a and the pivot 310c Accordingly, the motions of the flaps 121a, 121b, 121c are interrelated with the differentials 302a, 302b, 302c, thereby providing a resultant displacement that can be measured at the sensor 301 via movement or displacement of the shaft 304. In other words, the rotational displacement of the shaft 304 indicates movement and/or a condition of not only the flap 121a, but the flaps 121b, 121c as well. Example calculations are described below in connection with FIG. 4.

While the example of FIG. 3 includes three of the flaps 121a, 121b, 121c and three of the differentials 302a, 302b, 302c, any number of the flaps 121 or the differentials 302 can be implemented instead (e.g., two, four, five, ten, twenty, fifty, one hundred, etc.). Further, inputs and outputs of the differentials 302a, 302b, 302c can vary (e.g., be reversed). In other words, stating an output and input of a differential may vary and be dependent on how mechanical input is applied. In some examples, at least one of the differentials 302a, 302b, 302c is substituted with a gearbox.

Figure 4:
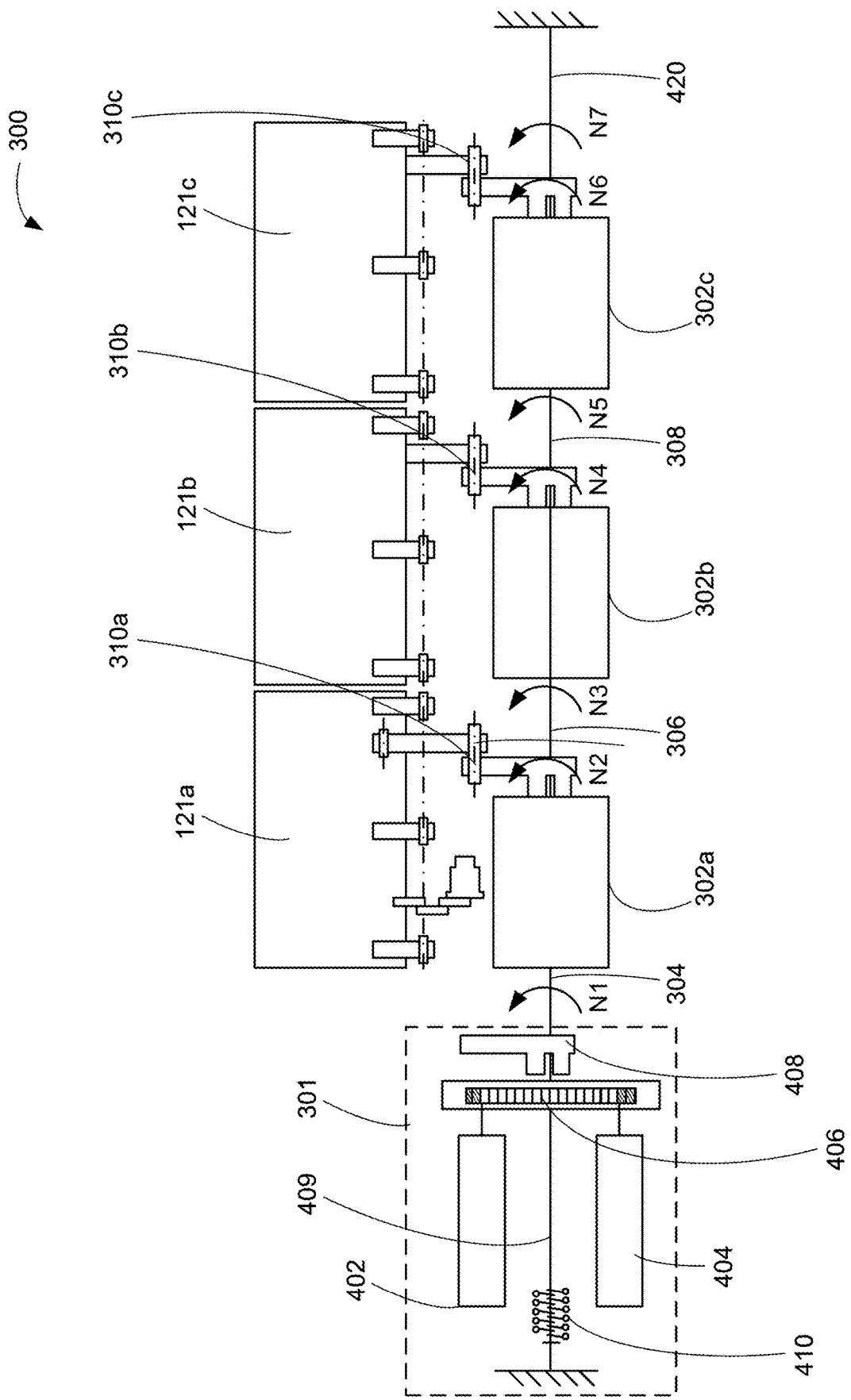
FIG. 4 is a schematic overview of a portion of the example sensing system of FIG. 3.

FIG. 4 is a schematic overview of the example sensing system 300 of FIG. 3. In the illustrated example, the sensing system 300 is depicted with the sensor 301, the shaft 304, the differentials 302a, 302b, 302c, the shaft 306 and the shaft 308. The example flap 121a is pivoted at the pivot 310a, which is coupled to an output of the differential 302a while the flap 121b is pivoted at the pivot 310b, which is coupled to an output of the differential 302b. Likewise, the flap 121c is pivoted at the pivot 310c, which is coupled to an output of the differential 302c.

The sensor 301 of the illustrated example includes a first rotational sensor (e.g., a rotational sub-sensor, a sensor component, etc.) 402 and a second rotational sensor 404, both of which are rotationally coupled to a pinion 406 which, in turn, is coupled to and rotates with the shaft 304. In this example, an over travel arm (e.g., a rotating arm) 408 is coupled to an internal shaft 409 disposed within the sensor 301 and/or the shaft 304. In some examples, the sensor 301 includes a spring 410, which may be implemented as a torsional spring (e.g., an anti-backlash torsional spring).

In operation, a rotational movement of the shaft 304 at the input of the differential 302a is measured by the sensor 301 to determine a deflection of at least one of the flaps 121a, 121b, 121c and/or a condition (e.g., a rotational condition) associated with at least one of the flaps 121a, 121b, 121c. In other words, the arrangement of the differentials 302a, 302b, 302c with the pivots 310a, 310b, 310c associated with the flaps 121a, 121b, 121c enables movement information of the flaps 121a, 121b, 121c to be obtained via measurements at a single one of the sensors 301. As can be seen in FIG. 4, an input of the differential 302a is designated as "N1" and an output of the differential 302a is designated as "N2." Further, an input of the differential 302b is designated as "N3" and an output of the differential 302b is designated as "N4." Further, an input of the differential 302c is designated as "N5," an output of the differential 302c is designated as "N6" and a rotation of a shaft 420 is designated as "N7." In this example, the shaft 420 is generally stationary (e.g., the shaft 420 is fixed and does not rotate) while the pivot 310c rotates.

In the illustrated example, the rotational displacement of the shaft 304 (e.g., "N1") can, therefore, be characterized by the following example Equations 1-7 below:

$$N5 = N6 + N7 \quad (1)$$

$$N7 = 0 \quad (2)$$

Combining Equations 1 and 2 yields Equation 3:

$$N5 = N6 \quad (3)$$

Further, $$N3 = N4 + N5 \quad (4)$$

Combining Equations 3 and 4 yields Equation 5:

$$N3 = N4 + N6 \quad (5)$$

Further, $$N1 = N2 + N3 \quad (6)$$

Combining Equations 5 and 6 yields Equation 7:

$$N1 = N2 + N4 + N6 \quad (7)$$

In the illustrated example, Equation 7 relates corresponding movement of the differentials 302a, 302b, 302c to a measured resultant displacement and/or movement of the shaft 304. Accordingly, deflection(s) and/or a condition of the shaft 304 measured by the sensor 301 is represented by "N1." In particular, displacement of the shaft 304, which is measured by the sensor 301 as the pinion 406 rotates along with the shaft 304, indicates movement of at least one of the flaps 121a, 121b, 121c. In other words, a sum displacement (e.g., a summed angular displacement) associated with the differentials 302a, 302b, 302c is used to determine the condition and/or displacement of the at least one of the flaps 121a, 121b, 121c.

The example calculations above are only examples and any appropriate equations and/or mathematical relationships can be employed instead. In other examples, other inputs or outputs of the differentials 302a, 302b, 302c are used to determine a condition and/or deflection(s) of the flaps 121a, 121b, 121c. Further, any appropriate arrangement of the differentials 302 may be implemented instead.

Figure 5A:
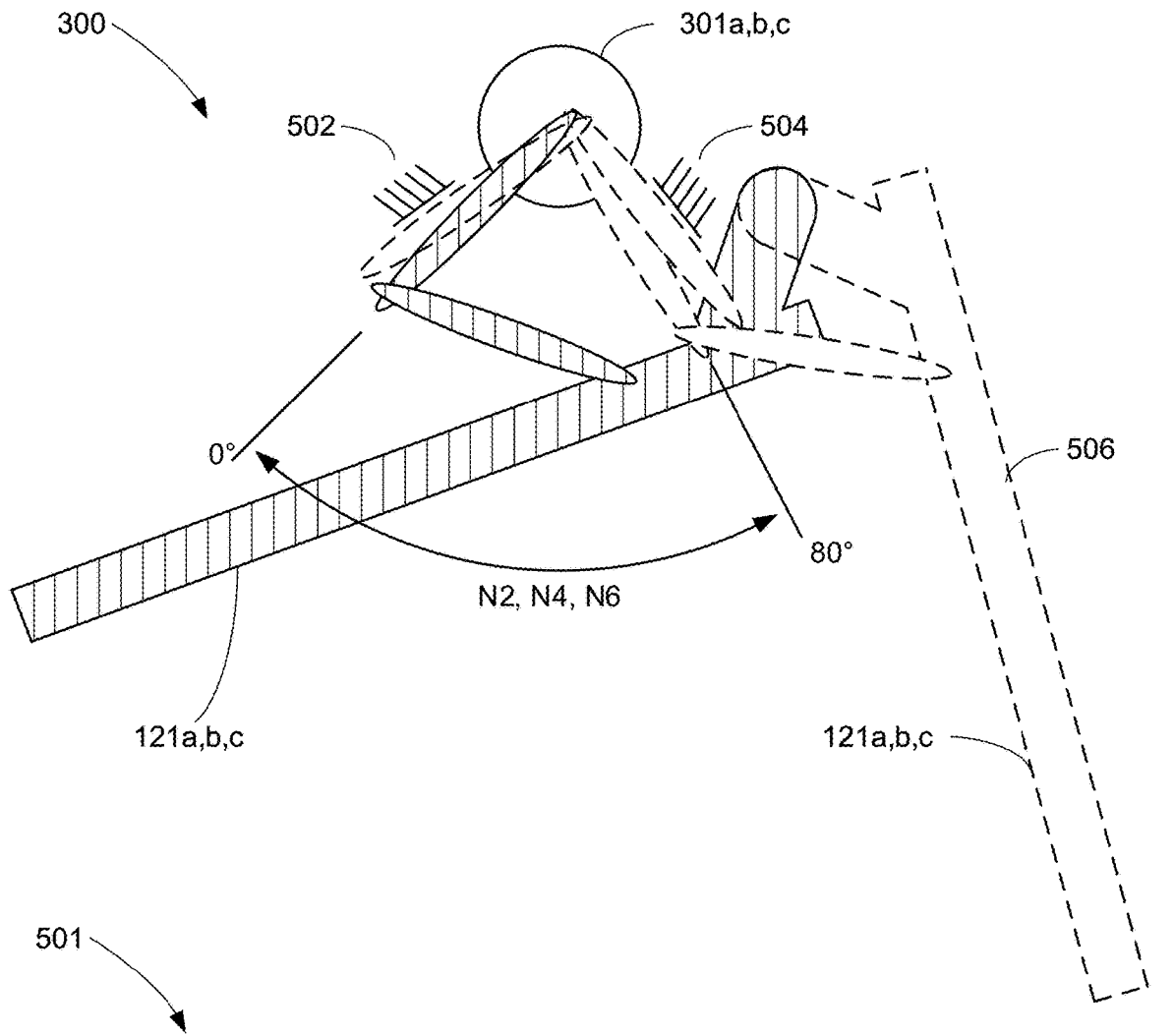
FIGS. 5A and 5B depict normal operation of the example sensing system of FIGS. 3 and 4.
Figure 5B:
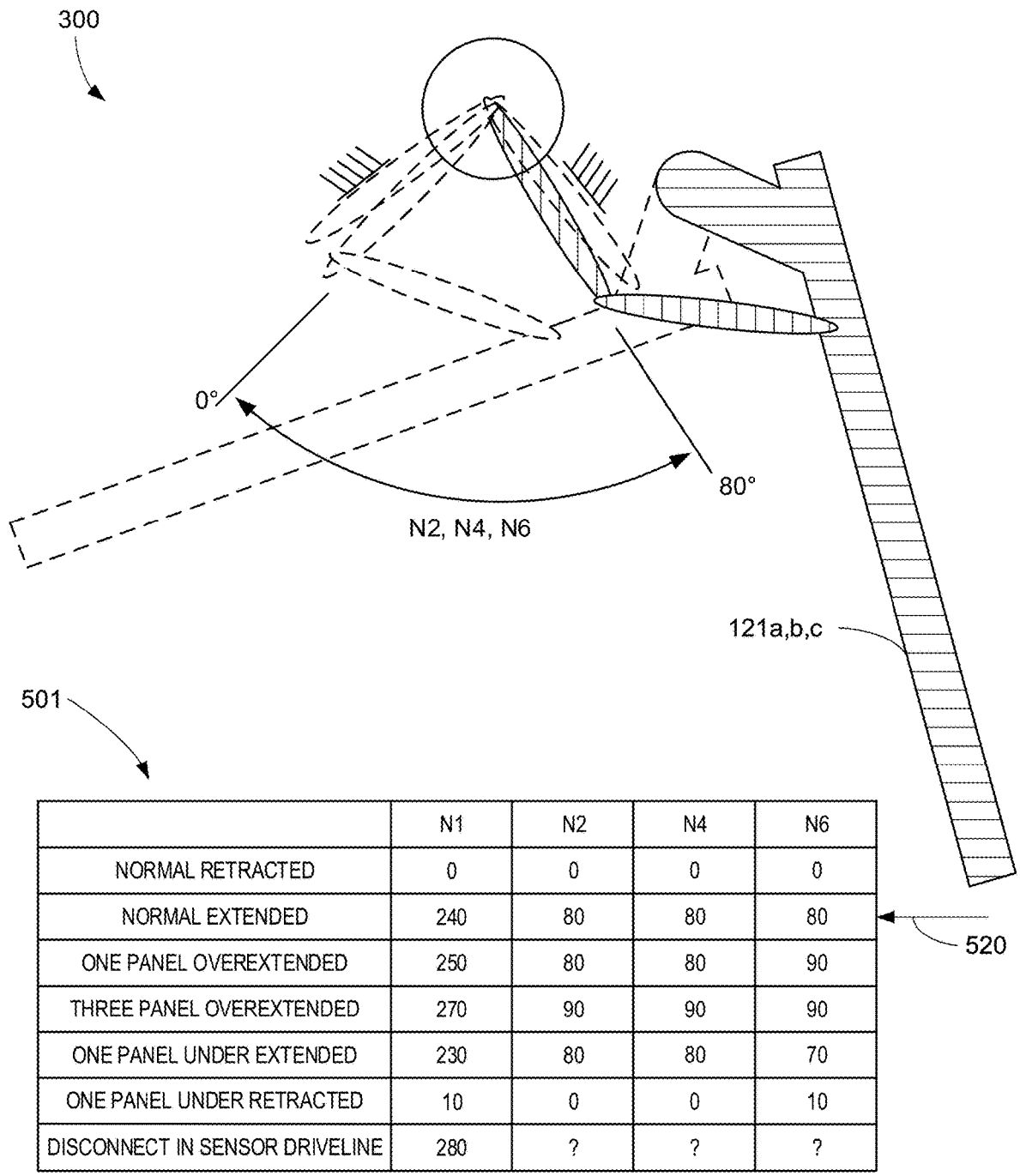

FIGS. 5A and 5B depict normal operation of the example sensing system 300 of FIGS. 3 and 4. Turning to FIG. 5A, a cross-sectional view of the sensing system 300 is shown along with a table 501. In the illustrated example, the sensing system 300 is shown in a normal retracted position in which the flaps 121a, 121b, 121c are not displaced (e.g., a rotational angle or baseline rotation angle of 0 degrees) from a neutral (e.g., retracted) position. Also, angular rotational stops 502 and 504, as well as a dotted representation 506 of the extended position of the flaps 121a, 121b, 121c, are depicted in FIG. 5A.

The example table 501 of the illustrated example enumerates multiple scenarios of the sensing system 300 In particular, the example table 501 relates angular measurements measured by the sensor 301 (of FIGS. 3 and 4) at the shaft 304. The scenario shown in FIG. 5 corresponds to a row 510 of the table 501 in which the outputs of the differentials 302a, 302b, 302c (e.g., "N2," "N4," "N6") are zero and, thus, the shaft 304 (shown in FIG. 3) has a corresponding sum displacement (e.g., "N1") of zero degrees.

FIG. 5B depicts the example sensing system 300 in a normal extended position along with the aforementioned table 501 also shown in FIG. 5A. In this example, a state of the sensing system 300 corresponds to a row 520 of the table 501. In particular, each of the flaps 121a, 121b, 121c is displaced at 80 degrees, thereby causing a sum measurement (e.g., "N1") to be 240 degrees, which corresponds to a normal extended position of each of the flaps 121a, 121b, 121c at 80 degrees in this example.

Figure 6:
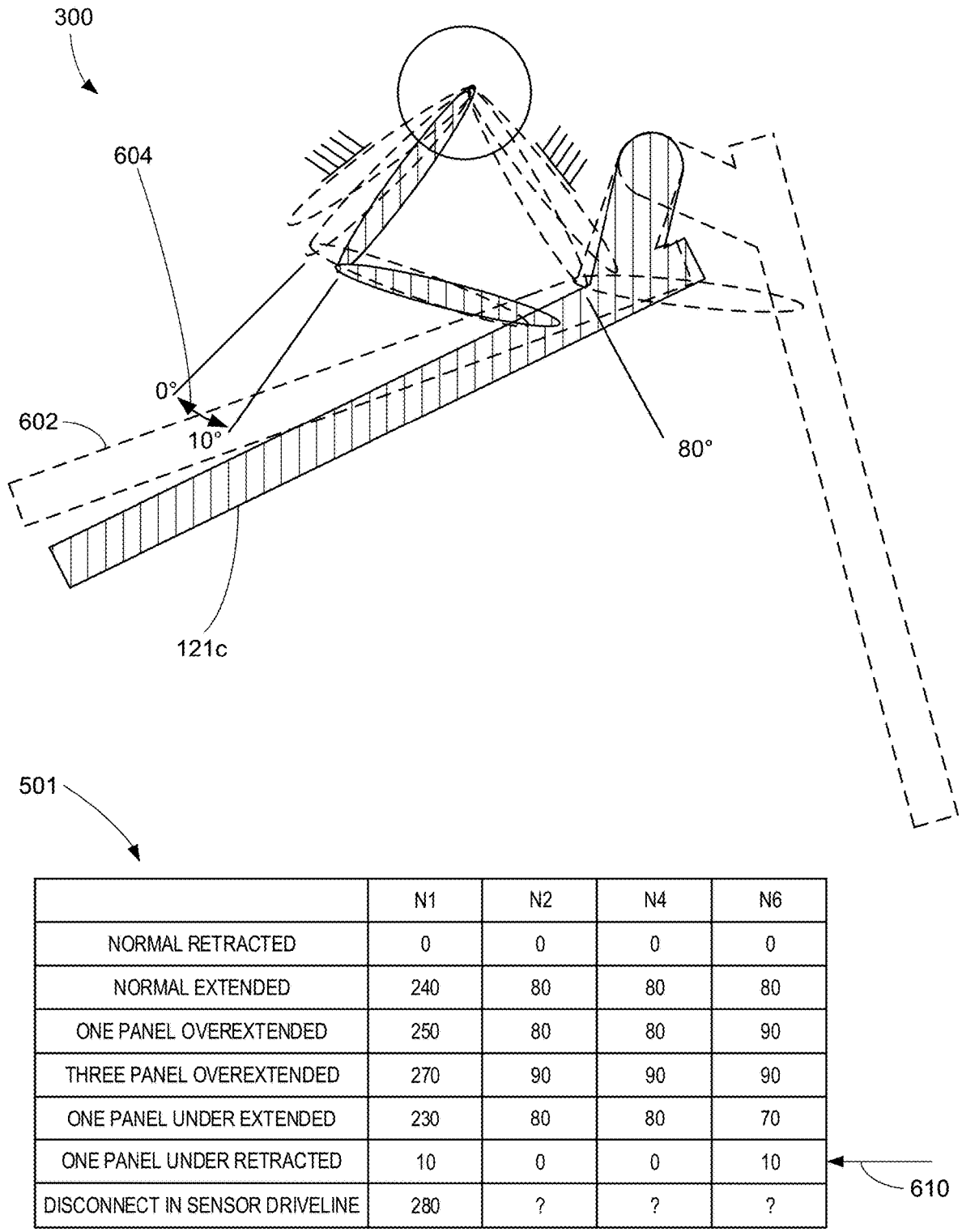
FIG. 6 depicts failure at a retracted position of the example sensing system of FIGS. 3-5B.

FIG. 6 depicts failure at a retracted position of at least one of the flaps 121a, 121b, 121c of the example sensing system 300 of FIGS. 3-5B. In the illustrated example, the flap 121c has failed to fully retract and its current position is depicted with solid lines in contrast to its intended position (e.g., an intended rotational displacement) 602, which corresponds to an angular displacement of 0 degrees. Accordingly, the flap 121c is depicted 10 degrees off from the intended position 602, as generally indicated by a double arrow 604. This failed retracted position corresponds to a row 610 of the table 501. In other examples, if one of the flaps 121a, 121b is out of position, the sum measurement (e.g., "N1") can be 10 degrees.

Figure 7A:
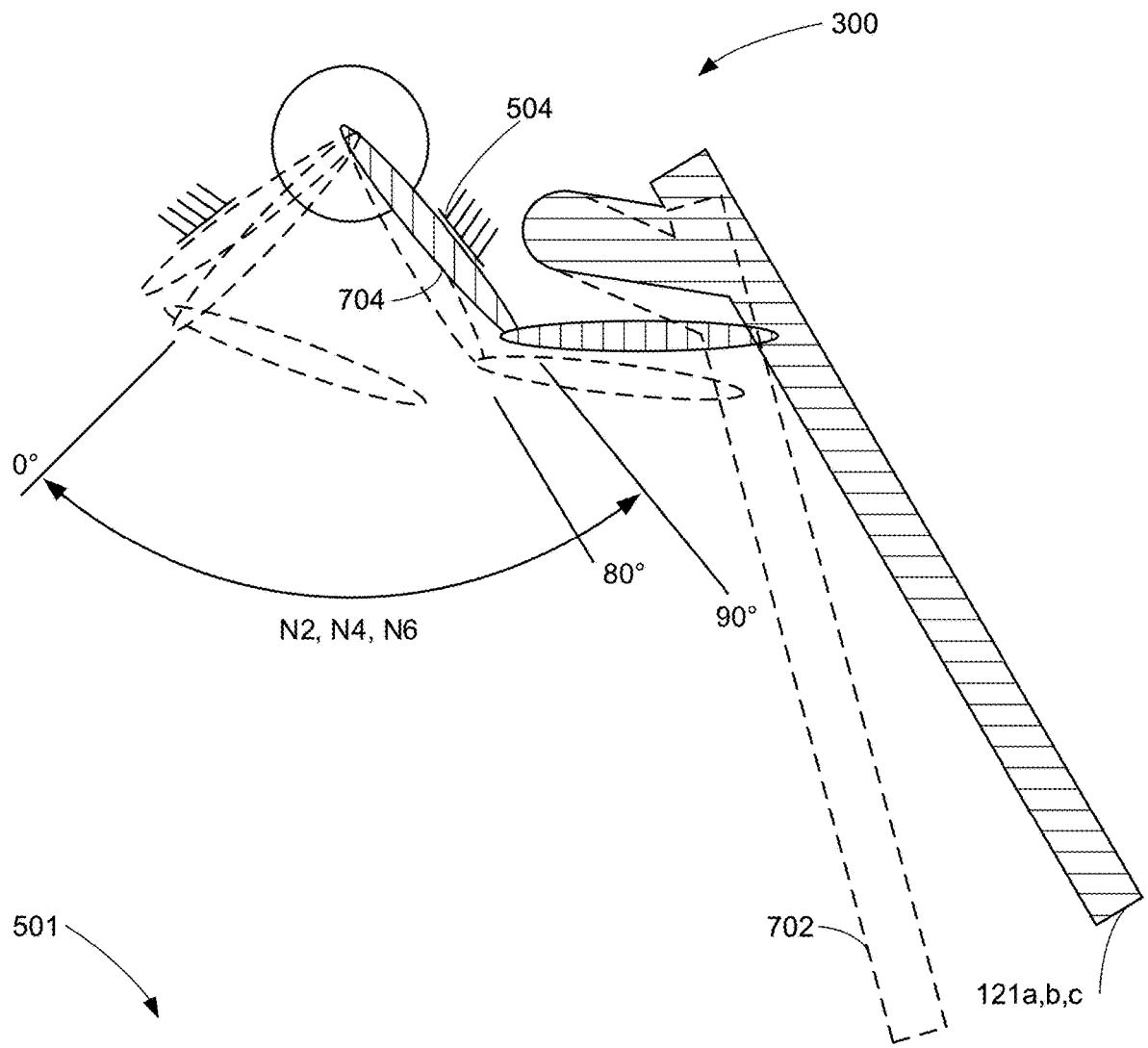
FIGS. 7A and 7B depict failure at an extended position of the example sensing system of FIGS. 3-6.
Figure 7B:
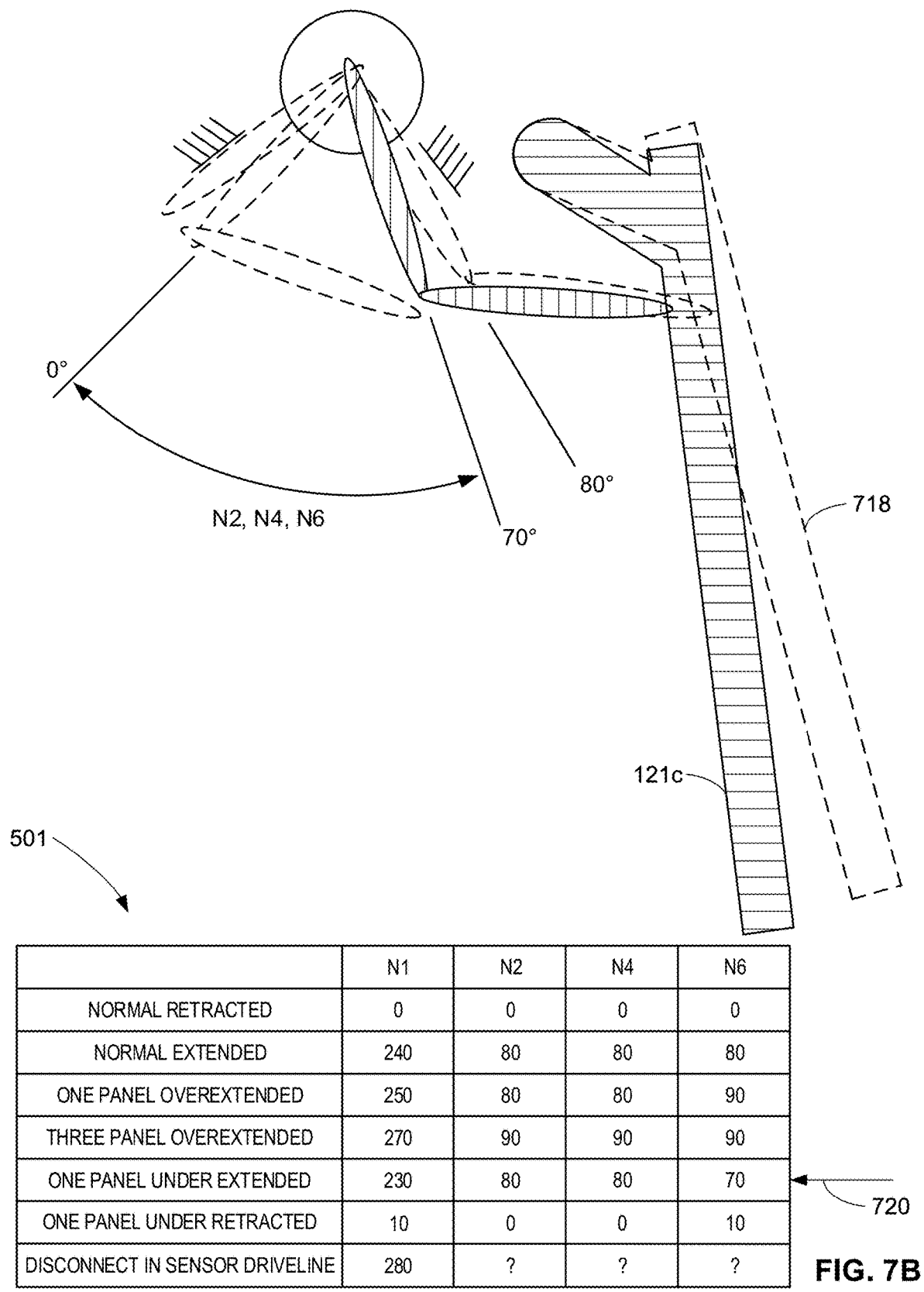

FIGS. 7A and 7B depict failure at an extended position of the example sensing system 300 of FIGS. 3-6. Turning to FIG. 7A, at least one of the flaps 121a, 121b, 121c is shown overextended away from an intended position 702, which is depicted by a dotted line, by 10 degrees (i.e., 90 degrees instead of the intended 80 degrees of rotational displacement). In this particular example, an arm 704 (e.g., of the pivot 310 of FIG. 3) has been brought into contact with the rotational stop 504, thereby preventing further motion of the overextended at least one of the flaps 121a, 121b, 121c.

In this example, the table 501 is shown. In particular, rows 710, 712 of the table 501 correspond to measurements (e.g., measured rotations) associated with overextension of at least one of the flaps 121a, 121b, 121c, as shown in FIG. 7A. As can be seen in the table 501, measurements exceeding 240 degrees at the shaft 304 can correspond to overextension failure of at least one of the flaps 121a, 121b, 121c.

Turning to FIG. 7B, the flap 121c of the example sensing system 300 is depicted in a failed extended position such that the flap 121c has under-traveled to a rotation of 70 degrees instead of an intended position 718 corresponding to 80 degrees. Accordingly, a row 720 of the table 501 indicates a measurement at the shaft 304 (shown in FIG. 3) that corresponds to the failed extended position of FIG. 7B.

Figure 8:
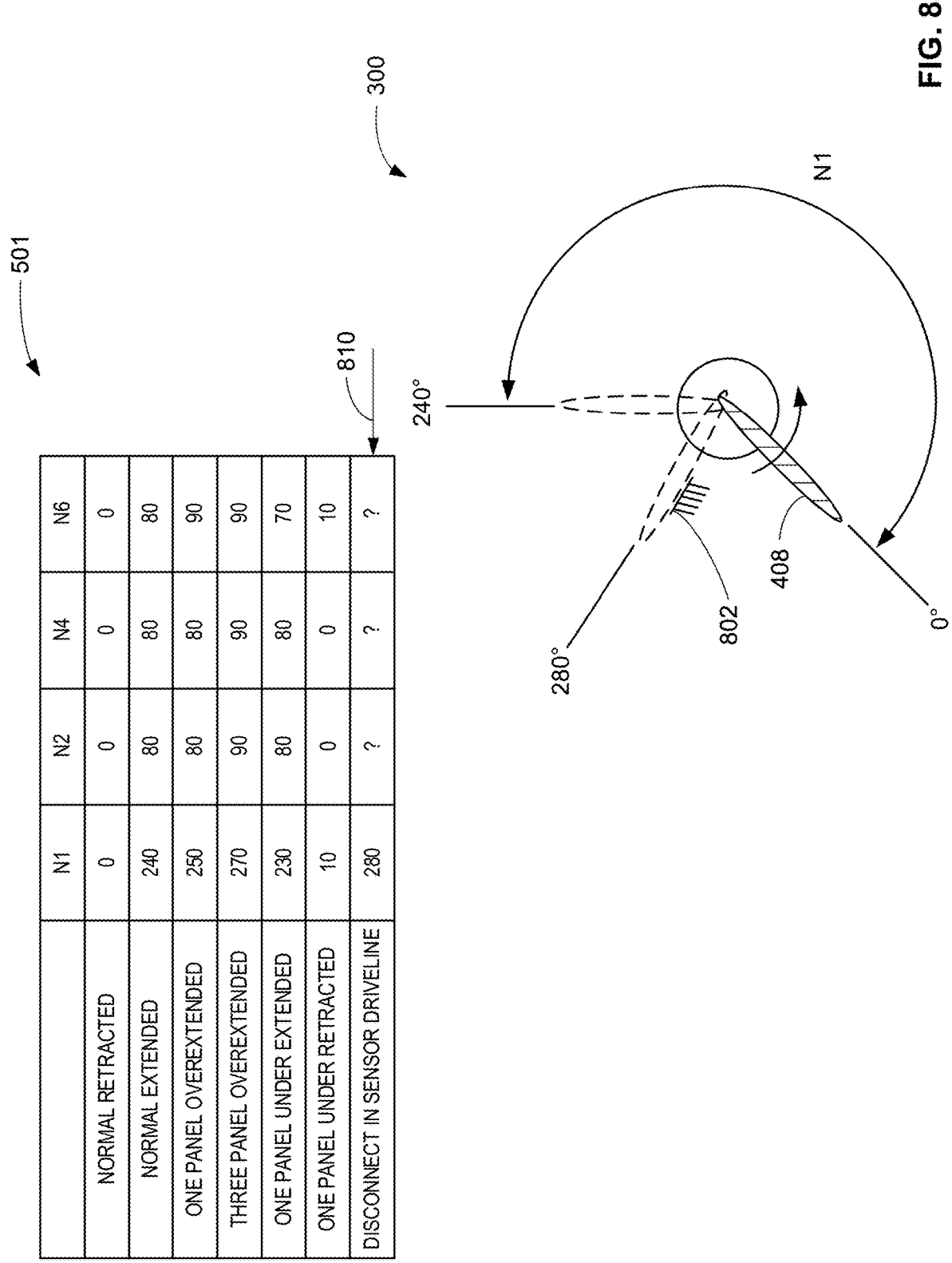
FIG. 8 depicts failure associated with a driveline disconnect of the example sensing system of FIGS. 3-7B.

FIG. 8 depicts failure associated with a driveline disconnect of the example sensing system 300 of FIGS. 3-7B. In this example, at least one of the shafts 304, 306, 308 (shown in FIG. 3) has been disconnected and/or damaged. In the illustrated example, the spring 410 (shown in FIG. 4) causes the shaft 304 and/or the shaft 409 (also shown in FIG. 4) to rotate, thereby moving the travel arm 408 toward an overtravel stop 802. In other words, the driveline disconnect failure causes the spring 410 to rotate the shaft 304 and/or the shaft 409 until the travel arm 408 contacts the overtravel stop 802. Thus, the spring 410 rotates the shaft 304 along with the travel arm 408 to a specified/pre-determined rotation that is measured by the sensor 301 to indicate a driveline disconnect failure. As can be seen in a row 810 of the table 501, a driveline disconnect failure leads to a measured value of 280 degrees, for example.

Figure 9:
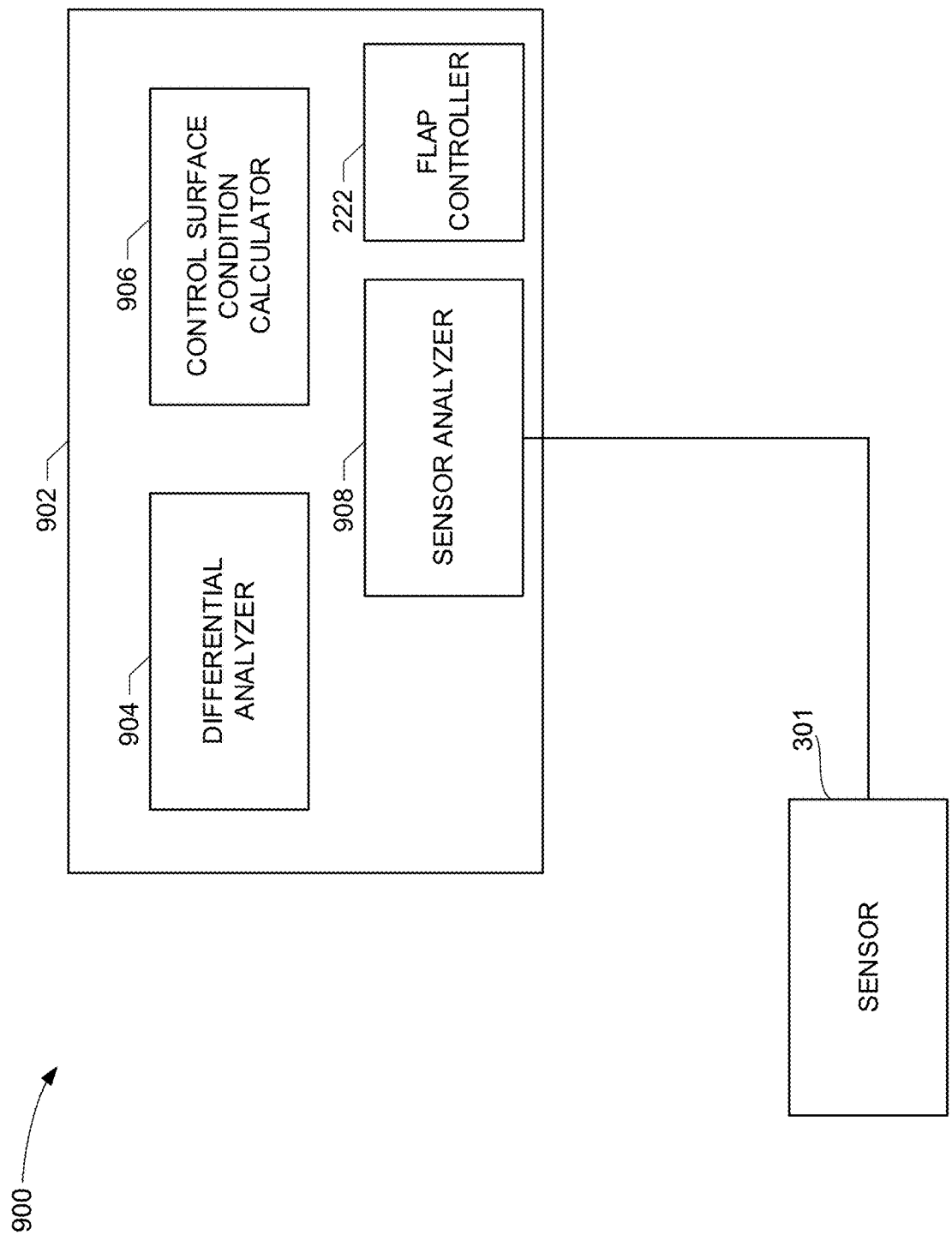
FIG. 9 is a schematic overview of a control surface analysis system that can be implemented with examples disclosed herein.

FIG. 9 is a schematic overview of a control surface analysis system 900 that can be implemented with examples disclosed herein. The control surface analysis system 900 of the illustrated example includes a control surface analyzer 902 which, in turn, includes a differential analyzer 904, a control surface condition calculator 906, a sensor analyzer 908, and the flap controller 222. In this example, the sensor analyzer 908 is communicatively coupled to the sensor 301.

In the illustrated example, the sensor data analyzer 908 receives data from the sensor 301 pertaining to movement of the shaft 304 (e.g., "N1"). In some examples, the sensor data analyzer 908 analyzes changes and/or angular movement (e.g., angular acceleration, angular speed, etc.) of the shaft 304 based on the aforementioned data from the sensor 301.

In this example, the differential analyzer 904 compares the data from the sensor 301 and/or analyzed data from the sensor analyzer 908 to compare displacement readings of the sensor 301 to expected angular displacement values that correspond to different conditions of the example sensing system 300. In some examples, the differential analyzer 904 may verify that a value read by the sensor 301 corresponds to one of two values corresponding to extended and retracted positions (e.g., 0 and 240 degrees, respectively). The differential analyzer 904 may use the calculations described above in connection with FIG. 4 to analyze measurements from the sensor 213. In this example, the differential analyzer 904 utilizes properties (e.g., known properties) of the differentials (e.g., differential output differences, differential ratios, etc.) for the comparison of the readings from the sensor 301 to the expected angular displacement value(s).

The control surface condition calculator 906 of the illustrated example determines a condition (e.g., an angular condition) of at least one of the flaps 121a, 121b, 121c based on the comparison performed by the differential analyzer 904. In this example, the control surface condition calculator 906 determines an existence of a failed retracted position, a failed extended position or a sensor driveline disconnect failure of the flaps 121a, 121b, 121c. Further, a table (e.g., the table 501) may be used to determine the condition (e.g., any measured values not equal or within a requisite degree of retracted or extended summed values corresponding to the flaps 121a, 121b, 121c). In some examples, the surface condition calculator 906 determines trends of the flaps 121a, 121b, 121c (e.g., gradual shifts of the flaps 121a, 121b, 121c over multiple flights).

The example flap controller 222 controls a movement of the flaps 121a, 121b, 121c. In particular, the flap controller 222 directs movement of at least one of the hydraulic motor 214, the actuators 206a, 206b, 206c or the electric motor 216, thereby moving the flaps 121a, 121b, 121c. In some examples, the flap controller 222 controls the movement based on a determination of the condition of the flaps 121a, 121b, 121c based on an analysis performed by the control surface condition calculator 906. In some examples, the sensor 402 and the shaft 409 can be connected to another sensor analyzer instead of the sensor analyzer 908 to increase system availability.

While an example manner of implementing the surface analysis system 900 of FIG. 9 is illustrated in FIG. 9, one or more of the elements, processes and/or devices illustrated in FIG. 9 may be combined, divided, re-arranged, omitted, eliminated and/or implemented in any other way. Further, the example differential analyzer 904, the example control surface condition calculator 906, the example sensor analyzer 908, the example flap controller 222 and/or, more generally, the example control surface analysis system 900 of FIG. 9 may be implemented by hardware, software, firmware and/or any combination of hardware, software and/or firmware. Thus, for example, any of the example differential analyzer 904, the example control surface condition calculator 906, the example sensor analyzer 908, the example flap controller 222 and/or, more generally, the example control surface analysis system 900 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example differential analyzer 904, the example control surface condition calculator 906, the example sensor analyzer 908 and/or the example flap controller 222 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control surface analysis system 900 of FIG. 9 may include one or more elements, processes and/or devices in addition to, or instead of, those illustrated in FIG. 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the control surface analysis system 900 of FIG. 9 is shown in FIG. 9. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 10, many other methods of implementing the example control surface analysis system 900 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 10:
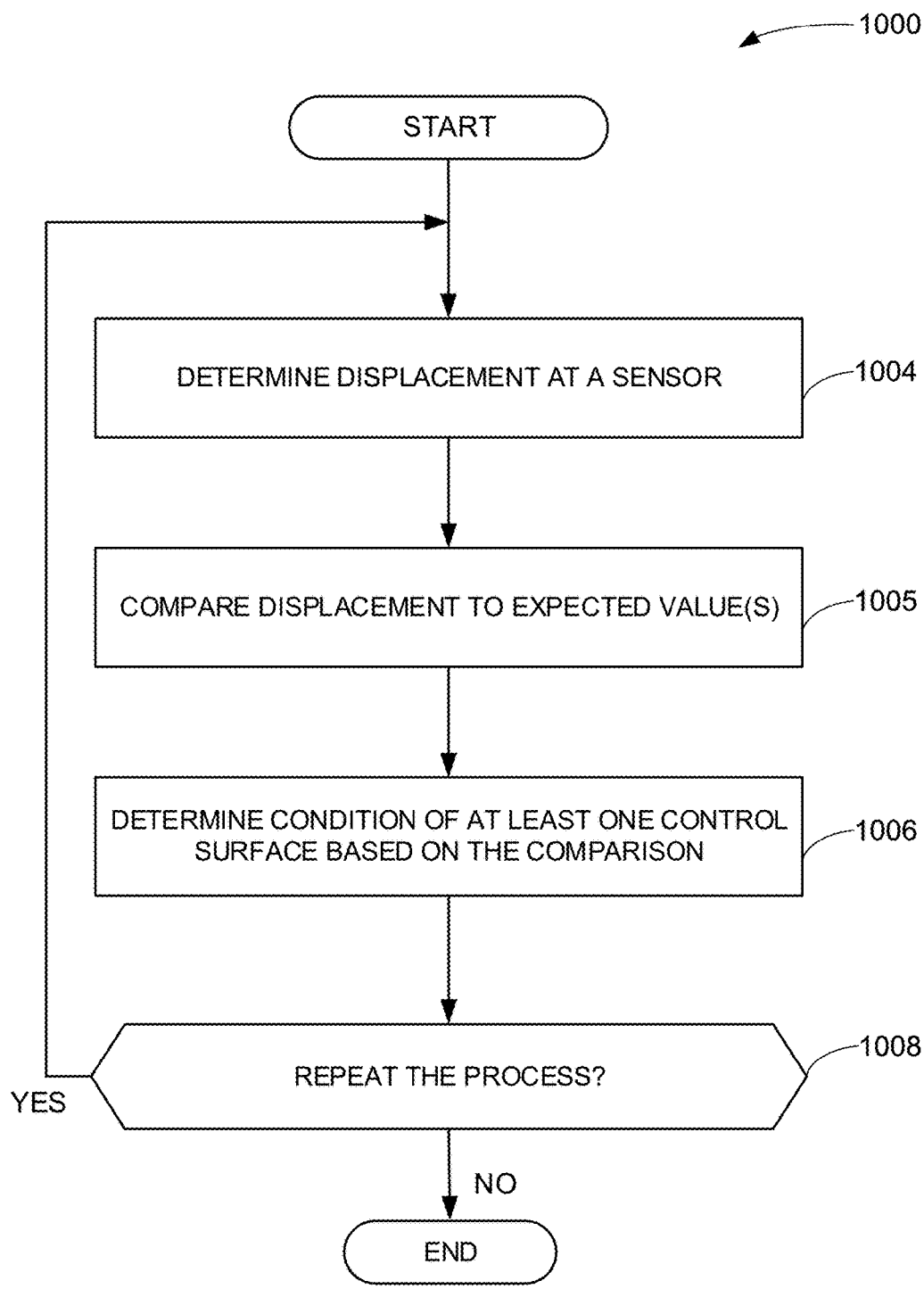
FIG. 10 is a flowchart representative of machine readable instructions which may be executed to implement examples disclosed herein.

The example method 1000 of FIG. 10 begins as control surfaces (e.g., the flaps 121*a*, 121*b*, 121*c*) are being monitored (e.g., when the control surfaces are stationary). However, the example method 1000 can be implemented when the control surfaces are moved and/or deflected. In this example, the sensing system 300 is being used to verify their corresponding angular displacement positions based on readings from the sensor 301. In particular, the example sensing system 300 is being used to verify whether the control surfaces have significantly deviated from their intended command positions.

At block 1004, the sensor analyzer 908 and/or the sensor 301 determines an angular displacement and/or rotation associated with the shaft 304 or an input of the differential 302*a*. In this example, this displacement is associated with "N1" shown in FIG. 4.

At block 1005, the differential analyzer 904 compares the determined angular displacement of the shaft 304 with an expected value (e.g., 0 degrees, 240 degrees, etc.). In this example, the differential analyzer 904 compares the determined displacement to two known expected values. The two known expected values can correspond to an expected retracted value and an expected extended value, for example. In some examples, the differential analyzer 904 determines that the measured value is within a tolerance (e.g., within 5%) of the corresponding known expected values.

At block 1006, the control surface condition analyzer 906 determines a condition of at least one of the control surfaces. In this example, the control surface condition analyzer 906 determines whether at least one of the control surfaces is deflected to a failed retracted position or a failed extended position. Additionally or alternatively, the surface condition analyzer 906 determines whether a driveline disconnect failure has occurred. In some examples, any measured displacement value that is determined to be significantly different (e.g., greater than a 5% difference) from the known expected values by the differential analyzer 904 may be determined to be a failure condition.

At block 1008, it is determined whether to repeat the process. If the process is to be repeated (block 1008), control of the process returns to block 1004.

Figure 11:
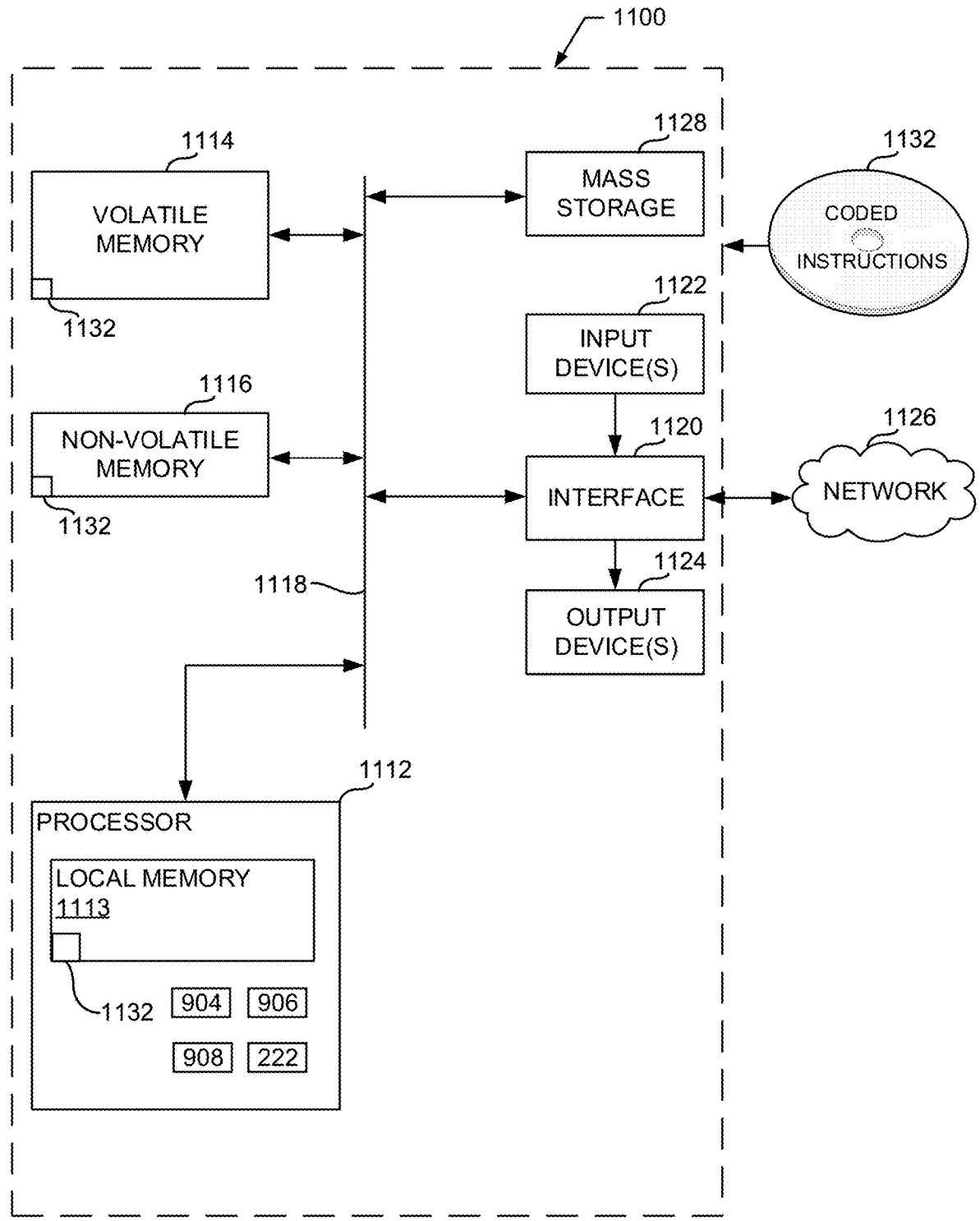
FIG. 11 is a block diagram of an example processing platform structured to execute the instructions of FIG. 10 to implement the control surface analysis system of FIG. 9 and/or the example sensing system of FIG. 3.

FIG. 11 is a block diagram of an example processor platform 1100 structured to execute the instructions of FIG. 10 to implement the control surface analysis system 900 of FIG. 9. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example differential analyzer 904, the example control surface condition calculator 906, the example sensor analyzer 908 and the example flap controller 222.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 10 may be stored in the mass storage device 1128, in the volatile memory 1114, in the non-volatile memory 1116, and/or on a removable non-transitory computer readable storage medium such as a CD or DVD.

Example 1 includes an apparatus for determining a condition associated with first and second control surfaces. The apparatus includes a sensor to measure a rotation of a shaft operatively coupled thereto. The apparatus also includes a first differential operatively coupled between the shaft and a first pivot of the first control surface, and a second differential operatively coupled between the first differential and a second pivot of the second control surface.

Example 2 includes the apparatus of Example 1, and further includes a third differential operatively coupled between the second differential and a third pivot of a third control surface.

Example 3 includes the apparatus of Example 1, and further includes a processor communicatively coupled to the sensor to determine the condition based on the measured rotation of the shaft.

Example 4 includes the apparatus of Example 1, where the processor is to determine the condition based on comparing the measured rotation to at least one expected rotational value.

Example 5 includes the apparatus of Example 1, and further includes a spring operatively coupled to the shaft.

Example 6 includes the apparatus of Example 5, where the spring is to rotate the shaft to a baseline rotation when a driveline disconnect failure associated with at least one of the first or second differentials occurs.

Example 7 includes the apparatus of Example 1, where the first and second control surfaces are flaps for an aircraft.

Example 8 includes an aerodynamic body for use with a vehicle. The aerodynamic body includes first and second control surfaces, at least one actuator to move the first and second control surfaces, and a shaft. The aerodynamic body also includes first and second differentials, where the first differential is operatively coupled between the shaft and a pivot associated with the first control surface, and where the second differential is operatively coupled between the first differential and a second pivot associated with the second control surface. The aerodynamic body also includes a rotational sensor operatively coupled to the shaft, where the rotational sensor is to measure a rotation of the shaft to determine a condition associated with the first and second control surfaces.

Example 9 includes the aerodynamic body of Example 8, and further includes a processor to determine the condition based on comparing the measured rotation to at least one expected rotational value.

Example 10 includes the aerodynamic body of Example 9, where the at least one expected rotational value includes a first rotational value corresponding to an expected value for a retracted position of the first and second control surfaces, and a second rotational value corresponding to an expected value for an extended position of the first and second control surfaces.

Example 11 includes the aerodynamic body of Example 8, where the aerodynamic body is a wing, and wherein the first and second control surfaces are flaps.

Example 12 includes the aerodynamic body of Example 11, where the flaps are Krueger flaps.

Example 13 includes the aerodynamic body of Example 11, and further includes a flap controller to vary a movement of the first and second control surfaces based on the determined condition.

Example 14 includes the aerodynamic body of Example 8, and further includes a spring operatively coupled to the shaft to rotate the shaft to a baseline rotation in response to a driveline disconnect failure associated with the first and second control surfaces.

Example 15 includes a non-transitory machine readable medium includes instructions, which when executed, cause a processor to at least determine a rotational displacement of a shaft operatively coupled to a first differential, where the first differential is operatively coupled between the shaft and a first pivot associated with a first control surface, and where a second differential is operatively coupled between the first differential and a second pivot associated with a second control surface. The instructions further cause the processor to compare the determined rotational displacement to at least one expected rotational value, and calculate a condition of at least one of the first or second control surfaces based on the comparison.

Example 16 includes the non-transitory machine readable medium of Example 15, where the instructions cause the processor to direct movement of at least one of the first or second control surfaces based on the calculated condition.

Example 17 includes the non-transitory machine readable medium of Example 15, where the at least one expected rotational value includes a first rotational value corresponding to a retracted position of the first and second control surfaces, and a second rotational value corresponding to an extended position of the first and second control surfaces.

Example 18 includes the non-transitory machine readable medium of Example 15, where the condition is calculated to determine whether one of the first or second control surfaces has deviated from an intended rotational displacement.

Example 19 includes the non-transitory machine readable medium of Example 15, where the condition is calculated by determining a presence of a driveline disconnect failure.

Example 20 includes the non-transitory machine readable medium of Example 15, where the instructions cause the processor to calculate first and second rotational displacements of the first and second control surfaces, respectively, based on the rotational displacement of the shaft.

Example 21 includes a method including determining a rotational displacement of a shaft operatively coupled to a first differential, where the first differential is operatively coupled between the shaft and a first pivot associated with a first control surface, and where a second differential is operatively coupled between the first differential and a second pivot associated with a second control surface. The method also includes comparing the determined rotational displacement to at least one expected rotational value, and determining a condition of at least one of the first or second control surfaces based on the comparison.

Example 22 includes the method of Example 21, and further includes directing movement of at least one of the first or second control surfaces based on the determined condition.

Example 23 includes the method of Example 21, where the at least one expected rotational value includes a first rotational value corresponding to a retracted position of the first and second control surfaces, and a second rotational value corresponding to an extended position of the first and second control surfaces.

Example 24 includes the method of Example 21, where determining the condition includes determining whether one of the first or second control surfaces has deviated from an intended rotational displacement.

Example 25 includes the method of Example 21, where determining the condition includes determining a presence of a driveline disconnect failure.

From the foregoing, it will be appreciated that example methods, apparatus and articles of manufacture have been disclosed that provide a cost-effective and reliable manner to measure multiple control surfaces with a single sensor. Examples disclosed herein enable accurate determination of a condition of the control surfaces using the aforementioned sensor, thereby saving complexity, repair downtime and costs associated with implementing multiple sensors.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for determining a condition associated with first and second control surfaces, the apparatus comprising,
   a sensor to measure a rotation of a shaft operatively coupled thereto;
   a first differential operatively coupled between the shaft and a first pivot of the first control surface, the shaft operatively coupled to an input of the first differential and the first pivot operatively coupled to an output of the first differential; and
   a second differential operatively coupled between the first differential and a second pivot of the second control surface, the output of the first differential operatively coupled to an input of the second differential and the second pivot operatively coupled to an output of the second differential.

2. The apparatus as defined in claim 1, further including a third differential operatively coupled between the second differential and a third pivot of a third control surface.

3. The apparatus as defined in claim 1, further including a processor communicatively coupled to the sensor to determine the condition based on the measured rotation of the shaft.

4. The apparatus as defined in claim 3, wherein the processor is to determine the condition based on comparing the measured rotation to at least one expected rotational value.

5. The apparatus as defined in claim 1, further including a spring operatively coupled to the shaft.

6. The apparatus as defined in claim 5, wherein the spring is to rotate the shaft to a baseline rotation when a driveline disconnect failure associated with at least one of the first or second differentials occurs.

7. The apparatus as defined in claim 1, wherein the first and second control surfaces are flaps for an aircraft.

8. The apparatus as defined in claim 1, wherein the first and second differentials are arranged across a span of an aerodynamic body.

9. The apparatus as defined in claim 8, wherein the first and second differentials are sequentially arranged along the span of the aerodynamic body.

10. The apparatus as defined in claim 1, wherein the rotation of the shaft is the summed rotation of the first and second differentials, and wherein the summed rotation indicates an operational condition of the first and second control surfaces.

11. The apparatus as defined in claim 1, wherein a first axis of rotation of the first pivot is aligned with a second axis of rotation of the second pivot.

12. An aerodynamic body for use with a vehicle, the aerodynamic body comprising:
    first and second control surfaces;
    at least one actuator to move the first and second control surfaces;
    a shaft;
    first and second differentials, the first differential operatively coupled between the shaft and a first pivot associated with the first control surface, the second differential operatively coupled between the first differential and a second pivot associated with the second control surface, the shaft operatively coupled to an input of the first differential and the first pivot operatively coupled to an output of the first differential, the output of the first differential operatively coupled to an input of the second differential and the second pivot operatively coupled to an output of the second differential; and a rotational sensor operatively coupled to the shaft, wherein the rotational sensor is to measure a rotation of the shaft to determine a condition associated with the first and second control surfaces.

13. The aerodynamic body as defined in claim 12, further including a processor to determine the condition based on comparing the measured rotation to at least one expected rotational value.

14. The aerodynamic body as defined in claim 13, wherein the at least one expected rotational value includes a first rotational value corresponding to an expected value for a retracted position of the first and second control surfaces, and a second rotational value corresponding to an expected value for an extended position of the first and second control surfaces.

15. The aerodynamic body as defined in claim 12, wherein the aerodynamic body is a wing, and wherein the first and second control surfaces are flaps.

16. The aerodynamic body as defined in claim 15, wherein the flaps are Krueger flaps.

17. The aerodynamic body as defined in claim 15, further including a flap controller to vary a movement of the first and second control surfaces based on the determined condition.

18. The aerodynamic body as defined in claim 12, further including a spring operatively coupled to the shaft to rotate the shaft to a baseline rotation in response to a driveline disconnect failure associated with the first and second control surfaces.

19. A non-transitory machine readable medium comprising instructions, which when executed, cause a processor to at least:

determine a rotational displacement of a shaft operatively coupled to a first differential, wherein the first differential is operatively coupled between the shaft and a first pivot associated with a first control surface, and wherein a second differential is operatively coupled between the first differential and a second pivot associated with a second control surface, the shaft operatively coupled to an input of the first differential and the first pivot operatively copuled to an output of the first differential, the output of the first differential operatively coupled to an input of the second differential and the second pivot operatively coupled to an output of the second differential;

compare the determined rotational displacement to at least one expected rotational value; and calculate a condition of at least one of the first or second control surfaces based on the comparison.

20. The non-transitory machine readable medium as defined in claim 19, wherein the instructions cause the processor to direct movement of at least one of the first or second control surfaces based on the calculated condition.

21. The non-transitory machine readable medium as defined in claim 19, wherein the at least one expected rotational value includes a first rotational value corresponding to a retracted position of the first and second control surfaces, and a second rotational value corresponding to an extended position of the first and second control surfaces.

22. The non-transitory machine readable medium as defined in claim 19, wherein the condition is calculated to determine whether one of the first or second control surfaces has deviated from an intended rotational displacement.

23. The non-transitory machine readable medium as defined in claim 19, wherein the condition is calculated by determining a presence of a driveline disconnect failure.

24. The non-transitory machine readable medium as defined in claim 19, wherein the instructions cause the processor to calculate first and second rotational displacements of the first and second control surfaces, respectively, based on the rotational displacement of the shaft.

25. The non-transitory machine readable medium as defined in claim 19, wherein the instructions cause the processor to determine first and second rotational orientations of the first and second control surfaces, respectively, based on the measured orientation.

26. The non-transitory machine readable medium as defined in claim 19, wherein the instructions cause the processor to determine whether at least one of the first or second control surfaces is overextended or underextended based on the determined rotational displacement.

27. The non-transitory machine readable medium as defined in claim 19, wherein the instructions cause the processor to determine a driveline disconnected failure based on the determined rotational displacement.

28. A method comprising:

determining a rotational displacement of a shaft operatively coupled to a first differential, wherein the first differential is operatively coupled between the shaft and a first pivot associated with a first control surface, and wherein a second differential is operatively coupled between the first differential and a second pivot associated with a second control surface, the shaft operatively coupled to an input of the first differential and the first pivot operatively coupled to an output of the first differential, the output of the first differential operatively coupled to an input of the second differential and the second pivot operatively coupled to an output of the second differential;

comparing the determined rotational displacement to at least one expected rotational value; and determining a condition of at least one of the first or second control surfaces based on the comparison.

29. The method as defined in claim 28, further including directing movement of at least one of the first or second control surfaces based on the determined condition.

30. The method as defined in claim 28, wherein the at least one expected rotational value includes a first rotational value corresponding to a retracted position of the first and second control surfaces, and a second rotational value corresponding to an extended position of the first and second control surfaces.

31. The method as defined in claim 28, wherein determining the condition includes determining whether one of the first or second control surfaces has deviated from an intended rotational displacement.

32. The method as defined in claim 28, wherein determining the condition includes determining a presence of a driveline disconnect failure.

* * * * *